United States Patent [19]

Su

[11] Patent Number: 4,939,197

[45] Date of Patent: Jul. 3, 1990

[54] METHOD OF MODIFYING THERMAL PROPERTIES OF POLYCARBOSILANE

[75] Inventor: Sophia R. Su, Weston, Mass.

[73] Assignee: GTE Laboratories Incorporated, Waltham, Mass.

[21] Appl. No.: 252,320

[22] Filed: Oct. 3, 1988

[51] Int. Cl.$^5$ ................................................ C08K 5/09
[52] U.S. Cl. ...................................... 524/300; 528/10; 524/489; 524/357; 524/359; 524/360
[58] Field of Search .................. 528/10; 524/300, 489, 524/351, 359, 360

[56] References Cited

U.S. PATENT DOCUMENTS

| | | | |
|---|---|---|---|
| 4,414,403 | 11/1983 | Schilling et al. | 556/430 |
| 4,472,591 | 9/1984 | Schilling et al. | 556/430 |
| 4,497,787 | 2/1985 | Schilling et al. | 423/345 |
| 4,777,234 | 10/1988 | Litt et al. | 528/10 |
| 4,820,788 | 4/1989 | Zeigler | 528/10 |

OTHER PUBLICATIONS

K. S. Mazdiyasni, R. West, and L. D. David, Am. Ceram. Soc., 61, (1978), pp. 504–508.

S. Yajima, Am. Ceram. Soc. Bull., 62, [8] (1983), pp. 893–898.

C. L. Schilling, Jr., J. P. Wesson, and T. C. Williams, Am. Ceram. Soc. Bull., 62, [8] (1983) pp. 912–915.

R. West, L. D. David, P. I. Djuovich, H. Yu, and R. Sinclair, Am. Ceram. Soc. Bull., 62, [8] (1983), pp. 899–903.

D. Seyferth and G. H. Wiseman, Am. Ceram. Soc., Comm., Jul. 1984, pp. C-132-133.

C. L. Schilling, Jr. and T. C. Williams, Am. Chem. Soc., Polymer Reprints, 25, (1), 1, (1984).

C. L. Schilling, Jr., Polymeric Routes to Silicon Carbide, British Polymer J., vol. 18, No. 6, 1986.

Primary Examiner—Melvyn I. Marquis
Attorney, Agent, or Firm—Frances P. Craig; Ivan L. Ericson

[57] ABSTRACT

A composition for injection molding a ceramic powder to make ceramic shapes is described. The composition comprises a ceramic powder and a binder system. The binder system comprises a distilled thermosetting polycarbosilane containing from about 0.4 to about 0.7 weight percent of a cross-linking inhibitor, a surfactant, and with or without a lubricant. The cross-linking inhibitor is selected from the group consisting of p-benzoquinone, benzophenone, and mixtures thereof.

9 Claims, No Drawings

METHOD OF MODIFYING THERMAL PROPERTIES OF POLYCARBOSILANE

FIELD OF THE INVENTION

This invention relates to a method of modifying polycarbosilane.

More particularly, this invention relates to a method of modifying thermal properties of polycarbosilane.

BACKGROUND OF THE INVENTION

In recent years, the search for cost-effective production of complex ceramic shapes used at elevated temperature has stimulated the research and development of polymeric ceramic precursors. Although significant progress has been made over the past years for fabrication of large complex injection molded shapes used in automotive engines, poor reliability and reproducibility have remained as critical issues, especially for large cross-section parts. The difficulty is caused by a fundamental problem related to uneven part shrinkage during binder burnout process. Therefore, the exploration of novel materials is needed to alleviate these problems.

Polycarbosilanes, polysilanes and polysilazanes have shown a wide range of application in ceramic processing. For example, hexaphenylcyclotrisilazane and methylphenylpolysilane were used to infiltrate porous reaction sintered silicon nitride, K. S. Mazdiyasni, R. West, and L. D. David, Am. Ceram. Soc., 61, (1978), pp. 504–508. Polycarbosilane and polysilazane have also been used to spin SiC, and $Si_3N_4$ fibers, S. Yajima, Am. Ceram. Soc. Bull., 62, [8] (1983), pp. 893–898; C. L. Schilling, Jr., J. P. Wesson, and T. C. Williams, Am. Ceram. Soc. Bull., 62, [8] (1983) pp. 912–915; R. West, L. D. David, P. I. Djuovich, H. Yu, and R. Sinclair, Am. Ceram. Soc. Bull., 62, [8] (1983), pp. 899–903; and D. Seyferth and G. H. Wiseman, Am. Ceram. So., Comm., July 1984, pp. C-132-133. Most of the polymeric preceramic precursors are relatively stable in air and are chemically compatible to $Si_3N_4$ and SiC powders. They show good flow characteristics and produce ceramic products upon pyrolysis. These precursors should be good binder candidates for injection molded $Si_3N_4$ parts.

Several polycarbosilane precursors' routes to silicon carbide ceramic composition have been developed, see: U.S. Pat. Nos. 4,414,403; 4,472,591; and 4,497,787 to C. L. Schilling, Jr., et al., and T. C. Williams, Am. Chem. Soc., Polymer Reprints, 25, (1), 1, (1984). The effectiveness of these materials as ceramic precursors is derived from a common structure feature, backbone bracketing at silicon atoms, generated either during synthesis or during conversion to ceramics. Examples of these polymer types are: hydrosilyl-modified polycarbosilanes, polysilahydrocarbons, and vinylic. Polysilanes are all prepared via active metal dechlorination of silane monomers using either potassium or sodium. Reactivity differences between the two metals have been a critical factor in the preparation of these polymers which typically provide 50–60 wt % yields of SiC compositions when pyrolyzed in an inert atmosphere. Thermoplastic polymers can be prepared with high yield through potassium metal dechlorination of mixtures of $(CH_3)_3SiCl$, $CH_3SiHCl_2$, and $CH_2=CHSiCH_3Cl_2$ in tetrahydrofuran solvent. Potassium causes disilylation of $CH_2=CHSi\equiv$ groups to form linear polycarbosilane.

While a thermoset polymeric product with a formulation of

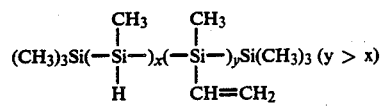

forms when dechlorinated with sodium metal. The vinyl $-CH=CH_2$ and SiH groups of vinylic polysilane provide an efficient thermal cross-linking mechanism not involving oxygen or weight loss. Cross-linking occurs via a combination of vinyl and SiH addition, and vinyl polymerization. Because of its advantages in cost, safety and precursor performance, the thermoset polycarbosilane is the preferred polymeric precursor.

The colorless, viscous liquid polymer resulted from dechloronation of 0.85 moles/0.3 moles/1.0 moles of $(CH_3)_3SiCl/(CH_3)SiHCl_2/CH_2=CHSiCH_3Cl_2$ with sodium metal begins to thermoset from 75° to 100° C., at which point pyrolytic degradation commences. Thermogravimetric Analysis (TGA) of this polymer in nitrogen indicates that 8–10% of weight loss occurs in the range of 100° to 175° C. The ceramic yield is in the range of 60 to 65 wt % upon pyrolysis at 1000° C. The volatile portion of the polymer, identified as low molecular weight silanes by gas chromatograph/mass spectrometry, can be removed by vacuum distillation at 65°–70° C., $10^{-3}$ mm-Hg. After removal of voltiles, this polymer thermosets in the range of 110° to 135° C. Because of its thermal cross-link nature, polycarbosilane provides several limitations as a binder for injection molding. It was partially cross-linked during compounding and completely hardened in the injection molders' chamber. The rate of cross linking was enhanced by the injection speed, molding pressure and injection barrel temperature. Therefore, the development of an inhibitor or a retarder to delay the thermosetting which prevents premature cross-linking is essential.

SUMMARY OF THE INVENTION

In accordance with one aspect of the present invention, a new and improved composition for injection molding a ceramic powder to make ceramic shapes comprises a binder system. The binder system comprises a distilled thermosetting polycarbosilane containing from about 0.4 to about 0.7 weight percent of a cross-linking inhibitor selected from the group consisting of p-benzoquinone, benzophenone, and mixtures thereof, and a surfactant.

DETAILED DESCRIPTION OF THE PREFERRED EMBODIMENTS

After a comprehensive evaluation of the available polycarbosilanes and polysilazanes as a $Si_3N_4$ based composite (AY6 containing $Si_3N_4$, 6.0 wt % $Y_2O_3$, and 2.0 wt % $Al_2O_3$) binder by slip-isostatical cast shape forming technique, Union Carbide's polycarbosilane (vinylic polysilane) was selected as a binder for injection molded $Si_3N_4$ parts. Besides its availability in large quantity, this polycarbosilane has the following unique features:

The ability to thermally cross-link $SiCH=CH_2$ and SiH bonds to form $Si-CH_2-CH_2Si$ repeated units provides a rigid network structure around AY6 particles to prevent binder bleeding and particle rearrangement during binder removal process.

The ability to decompose to a gaseous species without melting can prevent bubble growth phenomena at the interface of the powder and the molten polymer.

The ability to decompose to nontoxic gases in a broad temperature range provides a potential for removing binder at a faster heating rate. This, in turn, makes the overall precision net-shape forming process more economically attractive or cost-effective.

Modifying the thermal properties of Union Carbide's polycarbosilane by the addition of an inhibitor provided a suitable addition to the binder system for injection molded $Si_3N_4$ based parts. Inhibitors or retarders should be able to reduce the concentration of radicals or can react with a radical to form products incapable of initiating cross-linking reaction (i.e. blocking active sites for polymerization). A list of inhibitors was then selected on the basis of this concept.

The general procedures for inhibitor evaluation are described as follows: 0.4 to 0.6 wt % with respect to polycarbosilane of an inhibitor was dissolved in 10 ml of distilled, deoxygenated toluene solution. This solution was added to 1.0 gr. of distilled polycarbosilane (low boiling fraction of polysilanes was removed) and was stirred with a magnetic stirring bar for 2 hrs to ensure a homogenous mixture. Excess solvent was removed by a stream of nitrogen followed by drying the sample with a vacuum pump. The sample was then scanned by Differential Scanning Calorimetry (DSC) to determine its initial thermal cross-linking temperature. Results are tabulated in Table I.

TABLE I

EVALUATION OF THERMAL CROSS-LINK INHIBITORS

| Inhibitor | wt % Used with Respect to Distilled Polycarbosilane | Initial Thermal Cross-Link Temperature °C. |
|---|---|---|
| None | 0 (not distilled) | 75 |
| None | Distilled Polycarbosilane | 125 |
| p-Benzoquinone | 0.578 | 175 |
| p-Benzoquinone | 0.500 | 170 |
| Benzophenone | 0.486 | 160 |
| Biphenyl | 0.603 | 125 |
| Diphenylamine | 0.579 | 135 |
| 4,4-methylene dianiline | 0.427 | 145 highly exothermic |
| p-Xylene | 0.505 | 130 |
| Triphenylmethane | 0.562 | 125 |

This study reveals that p-benzoquinone is the best inhibitor which delays the thermally cross-linking temperature of polycarbosilane from 125° C. to 175° C. as determined by Differential Scanning Calorimetry (DSC).

EXAMPLES 1-4.

Compounding experiments with $Si_3N_4$ powders (composition: 6 wt % $Y_2O_3$, 2 wt % $Al_2O_3$, and 92 wt % $Si_3N_4$) were carried out in a Haake compounder with a pair of sigma blades. 0.5 wt % of p-benzoquinone was incorporated into the distilled polycarbosilane. To increase the ceramic powder loading capacity, oleic acid, a surfactant, was added in Examples 1-4. In addition, paraffin wax (melting point 60°-70° C.) a lubricant, was added to Examples 3 and 4. The degree of thermally cross-linking of polycarbosilane was monitored at every 30 minute intervals by Differential Scanning Calorimetry (DCS).

TABLE II

COMPOUNDING RESULTS IN THE HAAKE COMPOUNDER

| Example | Binder Components | Composition | Compounding Conditions | Time (Minutes) Required To Thermally Cross-Link Polycarbosilane |
|---|---|---|---|---|
| 1 | Distilled Polycarbosilane, oleic acid | AY6 59.5 v/o Binder 40.5 v/o | Temperature: t = 35 to 40° C. RPM: 25 | 70 minutes |
| 2 | Inhibited polycarbosilane, oleic acid | AY6 62.6 v/o Binder 37.4 v/o | t = 40° RPM: 50 | 150 minutes |
| 3 | Distilled polycarbosilane, paraffin wax, and oleic acid | AY6 60.0 v/o Binder 40.0 v/o | t = 65° C. RPM: 25 | 30 minutes |
| 4 | Inhibited polycarbosilane, paraffin wax, and oleic acid | AY6 60.0 v/o Binder 40.0 v/o | t = 60° RPM: 24 | No sign of cross-linking after 165 min. |

These results further confirm that p-benzoquinone retards the thermally cross-linking behavior of polycarbosilane during compounding. Without inhibitor, polycarbosilane was cross-linked in the compounder after 30 minutes mixing at 65° C. By incorporating p-benzoquinone it is likely to mold AY6 powders with this binder system. Moreover, results from Example 2 and Example 4 show that the mechanism of inhibition is a simple retardation, time required to thermally cross-link polycarbosilane at 40° C. was extended from 70 minutes to 150 minutes after the incorporation of 0.5 wt % of polycarbosilane. No partial cross-linking during the period of compounding was detected by DSC. The mechanism seems to agree with the assumption that p-benzoquinone reacts with free radical initiators or with $CH_2=CH-Si/Si-H$ groups of polycarbosilane to retard the initial thermally cross-link rate. When p-benzoquinone has been totally consumed, then cross-linking starts. The amounts of p-benzoquinone required to retard the cross-linking behavior of polycarbosilane was then studied (Example 5–10) in order to mold AY6 powders with this binder system (which contains 75 wt % of inhibited polycarbosilane, 25 wt % of paraffin wax and oleic acid). The sample was compounded in a Haake compounder at 56° C. to 68° C. with 25 rpm. The ceramic parts were molded with Boy S15 injection molder at chamber temperature of 65° C., molder temperature of 35° C., and injection pressure at 115 bars. Results are tabulated in Table III.

TABLE III

INHIBITION STUDY OF POLYCARBOSILANE WITH p-BENZOQUINONE UNDER INJECTION MOLDING CONDITION

| Example | Wt % p-Benzoquinone Incorporated Into the Distilled Polycarbosilane | Thermally Cross-Linking Temperature at Compounding time = 0 min. vs time = 120 min. | Behavior Under Injection Molding Condition (Composition: 60.0 v/o AY6, 40.0 v/o Binder |
|---|---|---|---|
| 5 | 0 | 135° totally cross-linked | Unmoldable |
| 6 | 0.34 | 150°/110° | Sample was cross-linked at the nozzle of the injection molder |
| 7 | 0.482 | 170°/160° | Moldable with special care |
| 8 | 0.559 | 175°/150° | Moldable |
| 9 | 0.600 | 180°/150° | Moldable |
| 10 | 0.71 | 200°/150° | Moldable |

Therefore, the minimum amount of p-benzaoquinone required to retard the thermally cross-linking behavior of polycarbosilane should be at least 0.5 wt % under the selected injection molding condition for AY6 ceramic parts.

While there has been shown and described what is at present considered the preferred embodiment of the invention, it will be obvious to those skilled in the art that various changes and modifications may be made therein without departing from the scope of the invention as defined by the appended claims.

What is claimed is:

1. A composition for injection molding a ceramic powder to make ceramic shapes comprising a ceramic powder, said ceramic powder comprising approximately 92 weight percent silicon nitride, approximately 6 weight percent yttria and approximately 2 weight percent alumina, and a binder system, said binder system comprising a distilled thermosetting polycarbosilane containing from about 0.4 to about 0.7 weight percent of a cross-linking inhibitor selected from the group consisting of p-benzoquinone, benzophenone, and mixtures thereof, and a surfactant, said surfactant comprising oleic acid.

2. A composition in accordance with claim 1 wherein said cross-linking inhibitor comprises p-benzoquinone.

3. A composition in accordance with claim 1 wherein said cross-linking inhibitor comprises about 0.5 to about 0.7 weight percent of said distilled thermosetting polycarbosilane.

4. A composition in accordance with claim 1 wherein said binder system comprises about 37.4 volume percent to about 40.5 volume percent of said composition.

5. A composition for injection molding a ceramic powder to make ceramic shapes comprising a ceramic powder, said ceramic powder comprising approximately 92 weight percent silicon nitride, approximately 6 weight percent yttria and approximately 2 weight percent alumina, and a binder system, said binder system comprising a distilled thermosetting polycarbosilane containing from about 0.4 to about 0.7 weight percent of a cross-linking inhibitor selected from the group consisting of p-benzoquinone, benzophenone, and mixtures thereof, a surfactant, said surfactant comprising oleic acid and a lubricant.

6. A composition in accordance with claim 5 wherein said lubricant comprises paraffin wax having a melting point in the range of 60° to 70° C.

7. A composition in accordance with claim 5 wherein said cross-linking inhibitor comprises p-benzoquinone.

8. A composition in accordance with claim 5 wherein said cross-linking inhibitor comprises about 0.5 to about 0.7 weight percent of said distilled thermosetting polycarbosilane.

9. A composition in accordance with claim 5 wherein said binder system comprises about 37.4 volume percent to about 40.5 volume percent of said composition.

* * * * *